US009717314B2

(12) United States Patent
Idehara et al.

(10) Patent No.: US 9,717,314 B2
(45) Date of Patent: Aug. 1, 2017

(54) CASE FOR PORTABLE ELECTRONIC DEVICES WITH SHUTTER STAND

(71) Applicant: Targus Group International, Inc., Anaheim, CA (US)

(72) Inventors: Takuya Idehara, South Pasadena, CA (US); John David Mouser, Huntington Beach, CA (US); Jonny Yuan, Placentia, CA (US)

(73) Assignee: Targus International LLC, Anaheim, CA (US)

( * ) Notice: Subject to any disclaimer, the term of this patent is extended or adjusted under 35 U.S.C. 154(b) by 119 days.

(21) Appl. No.: 14/720,153

(22) Filed: May 22, 2015

(65) Prior Publication Data

US 2015/0375894 A1    Dec. 31, 2015

Related U.S. Application Data

(60) Provisional application No. 62/018,180, filed on Jun. 27, 2014.

(51) Int. Cl.
*B65D 5/52* (2006.01)
*A45C 11/00* (2006.01)
*G06F 1/16* (2006.01)

(52) U.S. Cl.
CPC .............. *A45C 11/00* (2013.01); *G06F 1/166* (2013.01); *G06F 1/1626* (2013.01); *A45C 2011/002* (2013.01); *A45C 2011/003* (2013.01); *A45C 2200/15* (2013.01); *G06F 2200/1633* (2013.01)

(58) Field of Classification Search
CPC ...... G06F 1/1626; G06F 1/166; G06F 1/1656; G06F 1/1633; B65D 5/52; B65D 5/5206
USPC .............................................. 206/45.24, 468
See application file for complete search history.

(56) References Cited

U.S. PATENT DOCUMENTS

| 556,526 A | 3/1896 | Baker |
|---|---|---|
| 1,121,422 A | 12/1914 | Tydings |
| 2,554,215 A | 5/1951 | Schell et al. |
| 2,556,066 A | 6/1951 | Cline |

(Continued)

FOREIGN PATENT DOCUMENTS

| CA | 2 758 982 A1 | 5/2012 |
|---|---|---|
| CA | 2 827 491 A1 | 9/2012 |

(Continued)

OTHER PUBLICATIONS

Non-Final Office Action for U.S. Appl. No. 14/720,093, filed May 22, 2015, and mailed from the USPTO on Feb. 22, 2017, 24 pgs.

(Continued)

*Primary Examiner* — Steven A. Reynolds
*Assistant Examiner* — Javier A Pagan
(74) *Attorney, Agent, or Firm* — John R. Thompson; Stoel Rives LLP (57) ABSTRACT

According to various embodiments, a case for a portable electronic device (PED) includes a stand that is configured to support a PED in an upright position. The stand may be pivotally coupled to a sliding member that can move along the case's back side. The sliding member and stand may move between a first position in which the stand supports the device in an upright position and a second position in which the stand lies flush with the rear face. Thus, the stand may selectively support the case in an upright position or be compact for easy storage.

19 Claims, 7 Drawing Sheets

(56) References Cited

U.S. PATENT DOCUMENTS

| | | |
|---|---|---|
| 3,023,794 A | 3/1962 | Lifton |
| 3,292,778 A | 12/1966 | Enderle |
| 3,441,072 A | 4/1969 | Schmitt |
| 3,530,213 A | 9/1970 | Isle |
| 3,620,149 A | 11/1971 | Ogihara |
| D230,376 S | 2/1974 | Andrew |
| 4,106,597 A | 8/1978 | Shook et al. |
| 4,259,568 A | 3/1981 | Dynesen |
| 4,685,570 A | 8/1987 | Medow |
| 4,700,832 A | 10/1987 | Champ |
| 4,901,897 A | 2/1990 | Briggs et al. |
| 5,024,328 A | 6/1991 | Bontrager |
| 5,165,649 A | 11/1992 | Neumann et al. |
| 5,207,327 A | 5/1993 | Brondos |
| 5,217,119 A | 6/1993 | Hollingsworth |
| 5,330,049 A | 7/1994 | Bertelsen et al. |
| 5,356,004 A | 10/1994 | Weinreb |
| 5,375,076 A | 12/1994 | Goodrich et al. |
| D356,120 S | 3/1995 | Allen |
| D357,918 S | 5/1995 | Doria |
| 5,480,118 A | 1/1996 | Cross |
| 5,524,754 A | 6/1996 | Hollingsworth |
| 5,544,792 A | 8/1996 | Arnwine |
| 5,555,157 A | 9/1996 | Moller et al. |
| 5,594,619 A | 1/1997 | Miyagawa et al. |
| 5,607,054 A | 3/1997 | Hollingsworth |
| 5,622,262 A | 4/1997 | Sadow |
| 5,708,561 A | 1/1998 | Huilgol et al. |
| 5,735,397 A | 4/1998 | Cyr |
| 5,769,221 A | 6/1998 | Cyr |
| 5,775,496 A | 7/1998 | Cyr |
| 5,797,044 A | 8/1998 | Lawther et al. |
| 5,887,723 A | 3/1999 | Myles |
| 5,971,148 A | 10/1999 | Jackson |
| 5,996,778 A | 12/1999 | Shih |
| 6,082,543 A | 7/2000 | Béliveau |
| 6,131,734 A | 10/2000 | Hollingsworth et al. |
| 6,173,933 B1 | 1/2001 | Whiteside et al. |
| 6,237,766 B1 | 5/2001 | Hollingsworth |
| 6,334,533 B1 | 1/2002 | Hollingsworth et al. |
| 6,334,534 B1 | 1/2002 | Hollingsworth et al. |
| D453,749 S | 2/2002 | Lee et al. |
| 6,494,321 B1 | 12/2002 | Sadow et al. |
| 6,535,199 B1 | 3/2003 | Canova, Jr. et al. |
| D476,149 S | 6/2003 | Andre et al. |
| 6,746,638 B1 | 6/2004 | Zadesky et al. |
| 6,772,879 B1 | 8/2004 | Domotor |
| 6,785,566 B1 | 8/2004 | Irizarry |
| D500,923 S | 1/2005 | Gonzalez et al. |
| 6,856,506 B2 | 2/2005 | Doherty et al. |
| D513,008 S | 12/2005 | Takizawa et al. |
| D527,176 S | 8/2006 | Andre et al. |
| D529,717 S | 10/2006 | Brancky |
| D533,348 S | 12/2006 | Andre et al. |
| 7,207,154 B2 | 4/2007 | Araujo |
| D541,646 S | 5/2007 | Hayes et a |
| 7,281,698 B2 | 10/2007 | Patterson, Jr. |
| D574,375 S | 8/2008 | Prest et al. |
| D574,819 S | 8/2008 | Andre et al. |
| 7,414,833 B2 | 8/2008 | Kittayapong |
| 7,451,872 B1 | 11/2008 | Allen |
| D582,405 S | 12/2008 | Andre et al. |
| 7,467,695 B2 | 12/2008 | Gormick et al. |
| 7,495,895 B2 | 2/2009 | Carnevali |
| 7,500,561 B2 | 3/2009 | Matias et al. |
| 7,503,440 B2 | 3/2009 | Gormick et al. |
| D593,528 S | 6/2009 | Shi |
| D600,699 S | 9/2009 | Johnston et al. |
| 7,652,873 B2 | 1/2010 | Lee |
| D610,111 S | 2/2010 | Kim et al. |
| 7,735,644 B2 | 6/2010 | Sirichai et al. |
| 7,747,007 B2 | 6/2010 | Hyun et al. |
| D619,554 S | 7/2010 | Kim et al. |
| D623,404 S | 9/2010 | Andre et al. |
| D623,638 S | 9/2010 | Richardson et al. |
| D623,639 S | 9/2010 | Richardson et al. |
| D628,197 S | 11/2010 | Li |
| 7,835,145 B2 | 11/2010 | Chiang et al. |
| D629,772 S | 12/2010 | Mo et al. |
| 7,876,550 B1 | 1/2011 | Albertini et al. |
| D637,814 S | 5/2011 | Akana et al. |
| 8,016,107 B2 | 9/2011 | Emsky |
| 8,051,980 B2 | 11/2011 | Tai et al. |
| 8,132,670 B1 | 3/2012 | Chen |
| D658,363 S | 5/2012 | Biddle |
| 8,173,893 B2 | 5/2012 | Huang |
| 8,201,687 B2 | 6/2012 | Zeliff et al. |
| 8,230,992 B2 | 7/2012 | Law et al. |
| 8,235,208 B2 | 8/2012 | Sirichai et al. |
| 8,253,518 B2 | 8/2012 | Lauder et al. |
| 8,281,924 B2 | 10/2012 | Westrup |
| 8,281,950 B2 | 10/2012 | Potts et al. |
| 8,312,991 B2 | 11/2012 | Diebel et al. |
| 8,328,008 B2 | 12/2012 | Diebel et al. |
| 8,393,464 B2 | 3/2013 | Yang et al. |
| 8,395,465 B2 | 3/2013 | Lauder et al. |
| 8,434,601 B2 * | 5/2013 | Hou ............ A45C 9/00 150/119 |
| 8,457,701 B2 | 6/2013 | Diebel |
| 8,459,453 B2 | 6/2013 | Parker et al. |
| 8,467,183 B2 | 6/2013 | Probst et al. |
| 8,522,965 B1 * | 9/2013 | Hsiung ............ H04B 1/3888 206/320 |
| 8,544,639 B2 | 10/2013 | Yang et al. |
| 8,573,394 B2 | 11/2013 | Ahee et al. |
| 8,605,433 B2 * | 12/2013 | Chiang ............ F16M 11/10 361/679.59 |
| 8,659,893 B2 * | 2/2014 | Chiou ............ G06F 1/1628 206/45.2 |
| 8,783,450 B2 * | 7/2014 | Wang ............ A45C 11/00 206/320 |
| 8,820,525 B1 * | 9/2014 | Zanxiang ............ F16M 11/10 206/320 |
| 8,905,231 B2 | 12/2014 | Couch, III et al. |
| 8,985,543 B2 * | 3/2015 | Chen ............ A45C 11/00 206/45.24 |
| 9,372,507 B2 * | 6/2016 | Dekock ............ G06F 1/166 |
| 2001/0014010 A1 | 8/2001 | Jenks et al. |
| 2001/0052710 A1 | 12/2001 | Witherell |
| 2002/0179470 A1 | 12/2002 | Lee |
| 2003/0186729 A1 | 10/2003 | Engstrom et al. |
| 2003/0213886 A1 * | 11/2003 | Gilbert ............ A47B 23/044 248/454 |
| 2004/0018863 A1 | 1/2004 | Engstrom et al. |
| 2004/0134812 A1 | 7/2004 | Yeh |
| 2004/0217027 A1 | 11/2004 | Harris et al. |
| 2004/0224732 A1 | 11/2004 | Lee et al. |
| 2004/0240164 A1 | 12/2004 | Lee |
| 2005/0057893 A1 | 3/2005 | Homer et al. |
| 2005/0237701 A1 | 10/2005 | Yu |
| 2006/0007645 A1 | 1/2006 | Chen et al. |
| 2006/0144662 A1 | 7/2006 | Hu |
| 2006/0226040 A1 | 10/2006 | Medina |
| 2007/0001079 A1 | 1/2007 | Patterson, Jr. |
| 2007/0056865 A1 | 3/2007 | Pelo |
| 2007/0057140 A1 | 3/2007 | Liou et al. |
| 2007/0163897 A1 * | 7/2007 | Lee ............ B42F 7/02 206/45.24 |
| 2007/0166028 A1 | 7/2007 | Kranz et al. |
| 2007/0279855 A1 | 12/2007 | Linsmeier et al. |
| 2008/0029412 A1 | 2/2008 | Ho et al. |
| 2008/0043411 A1 | 2/2008 | Chih et al. |
| 2008/0045279 A1 | 2/2008 | Ohki |
| 2008/0055835 A1 | 3/2008 | Kumano et al. |
| 2008/0226286 A1 | 9/2008 | Huang |
| 2008/0237432 A1 | 10/2008 | Patterson |
| 2008/0302687 A1 | 12/2008 | Sirichai et al. |
| 2009/0073337 A1 | 3/2009 | Liou et al. |
| 2009/0109558 A1 | 4/2009 | Schaefer |
| 2009/0127423 A1 | 5/2009 | Chen et al. |
| 2009/0178938 A1 | 7/2009 | Palmer |
| 2009/0223765 A1 | 9/2009 | Bosma |
| 2009/0223845 A1 | 9/2009 | Bosma et al. |

(56) References Cited

U.S. PATENT DOCUMENTS

| | | |
|---|---|---|
| 2009/0230006 A1 | 9/2009 | Pidgley et al. |
| 2010/0044259 A1 | 2/2010 | Wang |
| 2010/0072334 A1 | 3/2010 | Le Gette et al. |
| 2010/0082445 A1 | 4/2010 | Hodge et al. |
| 2010/0101975 A1 | 4/2010 | Zhang et al. |
| 2010/0116710 A1 | 5/2010 | Huang et al. |
| 2010/0225429 A1 | 9/2010 | Tsai |
| 2010/0232102 A1 | 9/2010 | Walker et al. |
| 2010/0258602 A1 | 10/2010 | Amin |
| 2010/0277858 A1 | 11/2010 | Zhou |
| 2010/0294683 A1 | 11/2010 | Mish et al. |
| 2010/0294909 A1 | 11/2010 | Hauser et al. |
| 2011/0034221 A1 | 2/2011 | Hung et al. |
| 2011/0090626 A1 | 4/2011 | Hoellwarth et al. |
| 2011/0221319 A1 | 9/2011 | Law et al. |
| 2011/0240448 A1 | 10/2011 | Springer et al. |
| 2011/0284420 A1 | 11/2011 | Sajid |
| 2011/0290687 A1 | 12/2011 | Han |
| 2011/0297566 A1 | 12/2011 | Gallagher et al. |
| 2011/0297581 A1 | 12/2011 | Angel |
| 2011/0315579 A1 | 12/2011 | Mase |
| 2012/0012483 A1 | 1/2012 | Fan |
| 2012/0168323 A1* | 7/2012 | Schmidt .............. F16M 11/10 206/45.24 |
| 2012/0176741 A1 | 7/2012 | Wu et al. |
| 2012/0199501 A1* | 8/2012 | Le Gette .............. F16M 11/04 206/45.24 |
| 2012/0217174 A1 | 8/2012 | Ting |
| 2012/0261289 A1 | 10/2012 | Wyner et al. |
| 2012/0298394 A1 | 11/2012 | Huang |
| 2013/0140194 A1 | 6/2013 | Han |
| 2014/0216954 A1 | 8/2014 | Law et al. |
| 2014/0262855 A1* | 9/2014 | Gandhi .............. A45C 11/00 206/45.24 |
| 2014/0291175 A1 | 10/2014 | Chung et al. |
| 2014/0347793 A1* | 11/2014 | Gao .............. H05K 5/0239 361/679.01 |

FOREIGN PATENT DOCUMENTS

| | | |
|---|---|---|
| DE | 20 2010 010 388 U1 | 1/2011 |
| EP | 1 548 544 A2 | 6/2005 |
| EP | 2 392 986 A2 | 12/2011 |
| EP | 2 426 571 A2 | 3/2012 |
| EP | 2 337 373 B1 | 12/2013 |
| GB | 2464583 B | 7/2010 |
| JP | H073344 U | 1/1995 |
| JP | 09135722 A | 5/1997 |
| JP | 2000014426 A | 1/2000 |
| JP | 2003230417 A | 8/2003 |
| JP | 2004509680 A | 4/2004 |
| JP | 2006024178 A | 1/2006 |
| KR | 20080075716 B | 8/2008 |
| TW | 200801649 A | 1/2008 |
| WO | WO 01/90848 A2 | 11/2001 |
| WO | WO 2010/036090 A2 | 4/2010 |
| WO | WO 2011/115918 A1 | 9/2011 |
| WO | WO 2011/130157 A2 | 10/2011 |
| WO | WO 2012/112790 A2 | 8/2012 |

OTHER PUBLICATIONS

Non-Final Office Action for U.S. Appl. No. 15/255,580, filed Sep. 2, 2016, and mailed from the USPTO on Apr. 11, 2017, 29 pgs.
Notice of Allowance for U.S. Appl. No. 15/067,789, filed Mar. 11, 2016, and mailed from the USPTO on Apr. 28, 2017, 14 pgs.
Non-Final Office Action for U.S. Appl. No. 13/601,799, filed Aug. 31, 2012, and mailed from the USPTO on Sep. 13, 2016, 49 pgs.
Non-Final Office Action for U.S. Appl. No. 15/067,789, filed Mar. 11, 2016, and mailed from the USPTO on Sep. 14, 2016, 29 pgs.
International Search Report and Written Opinion of PCT/US2011/039287, filed Jun. 6, 2011, and mailed Dec. 28, 2011, 11 pgs.
International Preliminary Report on Patentability for PCT/US2011/039287 filed Jun. 6, 2011, and mailed Dec. 20, 2012, 7 pgs.
Office Action for U.S. Appl. No. 12/370,824 filed Feb. 13, 2009, and mailed Jan. 4, 2013, (19 pgs.).
Office Action for U.S. Appl. No. 13/171,225 filed Jun. 28, 2011, and mailed from the USPTO on Apr. 16, 2013, 24 pgs.
Office Action for U.S. Appl. No. 13/285,565 filed Oct. 31, 2011, and mailed from the USPTO on May 9, 2013, 11 pgs.
Office Action for U.S. Appl. No. 12/370,824 filed Feb. 13, 2009, and mailed from the USPTO on May 20, 2013, 22 pgs.
Office Action for U.S. Appl. No. 13/791,445 filed Mar. 8, 2013, and mailed from the USPTO on Jun. 21, 2013, 20 pgs.
Third-Party Submission Under 37 CFR 1.290 Concise Description of Relevance, for U.S. Appl. No. 13/791,445 filed by Raymond Meiers in Ohio on Jul. 31, 2013, 14 pgs.
Notice of Allowance and Fee(s) Due for U.S. Appl. No. 12/370,824, filed Feb. 13, 2009, and mailed from the USPTO on Sep. 9, 2013, 12 pgs.
Office Action for U.S. Appl. No. 13/747,992, filed Jan. 23, 2013, and mailed from the USPTO on Oct. 23, 2013, 21 pgs.
Final Office Action for U.S. Appl. No. 13/791,445, filed Mar. 8, 2013, and mailed from the USPTO on Oct. 23, 2013, 21 pgs.
Final Office Action for U.S. Appl. No. 13/171,225, filed Jun. 28, 2011, and mailed from the USPTO on Dec. 4, 2013, 17 pgs.
Non-Final Office Action for U.S. Appl. No. 13/791,445, filed Mar. 8, 2013, and mailed from the USPTO on Dec. 27, 2013, 8 pgs.
Office Action for U.S. Appl. No. 13/739,846, filed Jan. 11, 2013, mailed Feb. 27, 2014, 19 pgs.
Non-final Office Action for U.S. Appl. No. 14/099,436, filed Dec. 6, 2013, and mailed from the USPTO on Mar. 26, 2014, 18 pgs.
Notice of Allowance and Fee(s) Due for U.S. Appl. No. 29/431,992, filed Sep. 12, 2012, and mailed from the USPTO on Apr. 2, 2014, 27 pgs.
Office Action for U.S. Appl. No. 13/791,445, filed Mar. 8, 2013, mailed from the USPTO Apr. 10, 2014, 9 pgs.
Notice of Allowance and Fee(s) Due for U.S. Appl. No. 13/747,992, filed Jan. 23, 2013, and mailed from the USPTO on Apr. 16, 2014, 10 pgs.
Notice of Allowance and Fee(s) Due for U.S. Appl. No. 13/791,445, filed Mar. 8, 2013, and mailed from the USPTO on Apr. 25, 2014, 8 pgs.
Office Action for U.S. Appl. No. 29/454,936, filed May 15, 2013, mailed from USPTO May 5, 2014, 22 pgs.
Office Action for U.S. Appl. No. 29/454,913, filed May 15, 2013, mailed from the USPTO May 7, 2014, 23 pgs.
Office Action for U.S. Appl. No. 29/454,934, filed May 15, 2013, mailed from the USPTO May 7, 2014, 23 pgs.
Notice of Allowance and Fee(s) Due for U.S. Appl. No. 14/099,436, filed Dec. 6, 2013, and mailed from the USPTO on May 13, 2014, 9 pgs.
Notice of Allowance and Fee(s) Due for U.S. Appl. No. 29/452,310, filed Apr. 15, 2013, and mailed from the USPTO on Sep. 25, 2014, 27 pgs.
Non-Final Office Action for U.S. Appl. No. 13/155,266, filed Jun. 7, 2011, and mailed from the USPTO on Nov. 6, 2014, 35 pgs.
Non-Final Office Action for U.S. Appl. No. 13/937,027, filed Jul. 8, 2013, and mailed from the USPTO on Feb. 3, 2015, 37 pgs.
Non-Final Office Action for U.S. Appl. No. 14/020,298, filed Sep. 6, 2013, and mailed from the USPTO on Feb. 12, 2015, 35 pgs.
Non-Final Office Action for U.S. Appl. No. 14/341,149, filed Jul. 25, 2014, and mailed from the USPTO on Apr. 21, 2015, 25 pgs.
Notice of Allowance for U.S. Appl. No. 13/155,266, filed Jun. 7, 2011, and mailed from the USPTO on May 15, 2015, 8 pgs.
Notice of Allowance and Fee(s) Due for U.S. Appl. No. 14/341,149, filed Jul. 25, 2014, and mailed from the USPTO on Jul. 8, 2015, 8 pgs.
Non-Final Office Action for U.S. Appl. No. 14/874,980, filed Oct. 5, 2015, and mailed from the USPTO on Jul. 15, 2016, 9 pgs.

* cited by examiner

CASE FOR PORTABLE ELECTRONIC DEVICES WITH SHUTTER STAND

RELATED APPLICATIONS

The present application claims priority to U.S. patent application Ser. No. 62/018,180, filed on Jun. 27, 2014, and is incorporated herein by reference in its entirety.

TECHNICAL FIELD

This disclosure generally relates to cases for portable electronic devices.

BRIEF DESCRIPTION OF THE DRAWINGS

Non-limiting and non-exhaustive embodiments of the disclosure are described, including various embodiments of the disclosure with reference to the figures, in which.

In the following description, numerous specific details are provided for a thorough understanding of the various embodiments disclosed herein. The embodiments disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

The present disclosure provides various embodiments of cases for securing, protecting, and/or supporting portable electronic devices (PEDs). According to various embodiments, a case may include a stand that is configured to support a PED in an upright position. In some embodiments, a stand may slide between a first position in which the stand supports the device in an upright position and a second position in which the stand lays flush with the case. When the stand is in the second position, the case may be compact for easy storage.

A "portable electronic device" (PED) as used throughout the specification may include any of a wide variety of electronic devices. Specifically contemplated and illustrated are tablet-style electronic devices, including, but not limited to, electronic readers, tablet computers, tablet PCs, mini tablets, phablets, cellular phones (including smart phones), interactive displays, video displays, touch screens, touch computers, etc.

Additionally, any of a wide variety of materials and manufacturing methods may be used to produce the various components of the presently described case for PEDs. For example, a universal case and/or the stand may utilize various plastics, rubbers, nylons, glasses, fabrics, leathers, and/or other suitable materials.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

Figure 1:
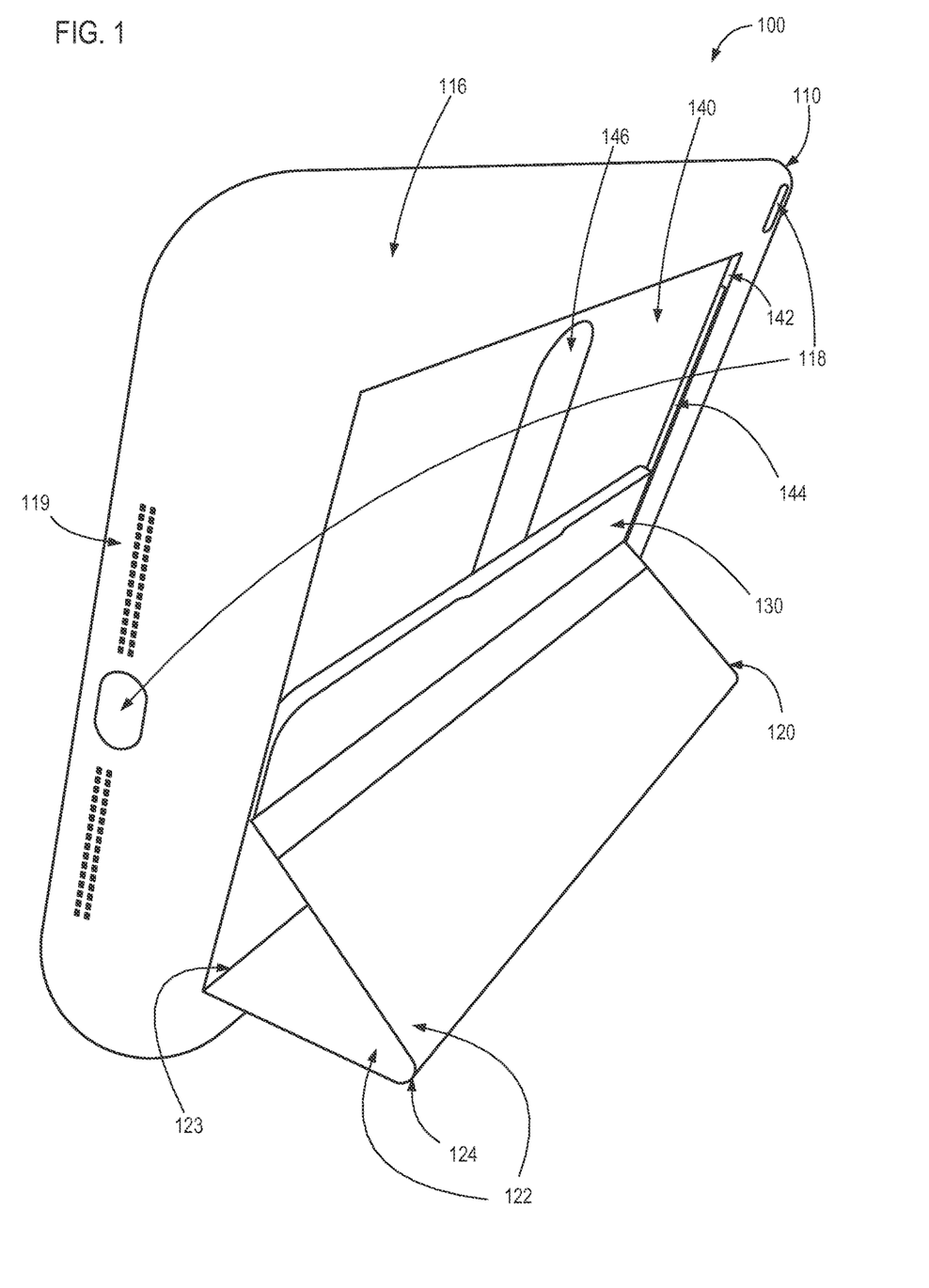
FIG. 1 is a side perspective view of a case with a stand supporting the case in an upright position.
Figure 2:
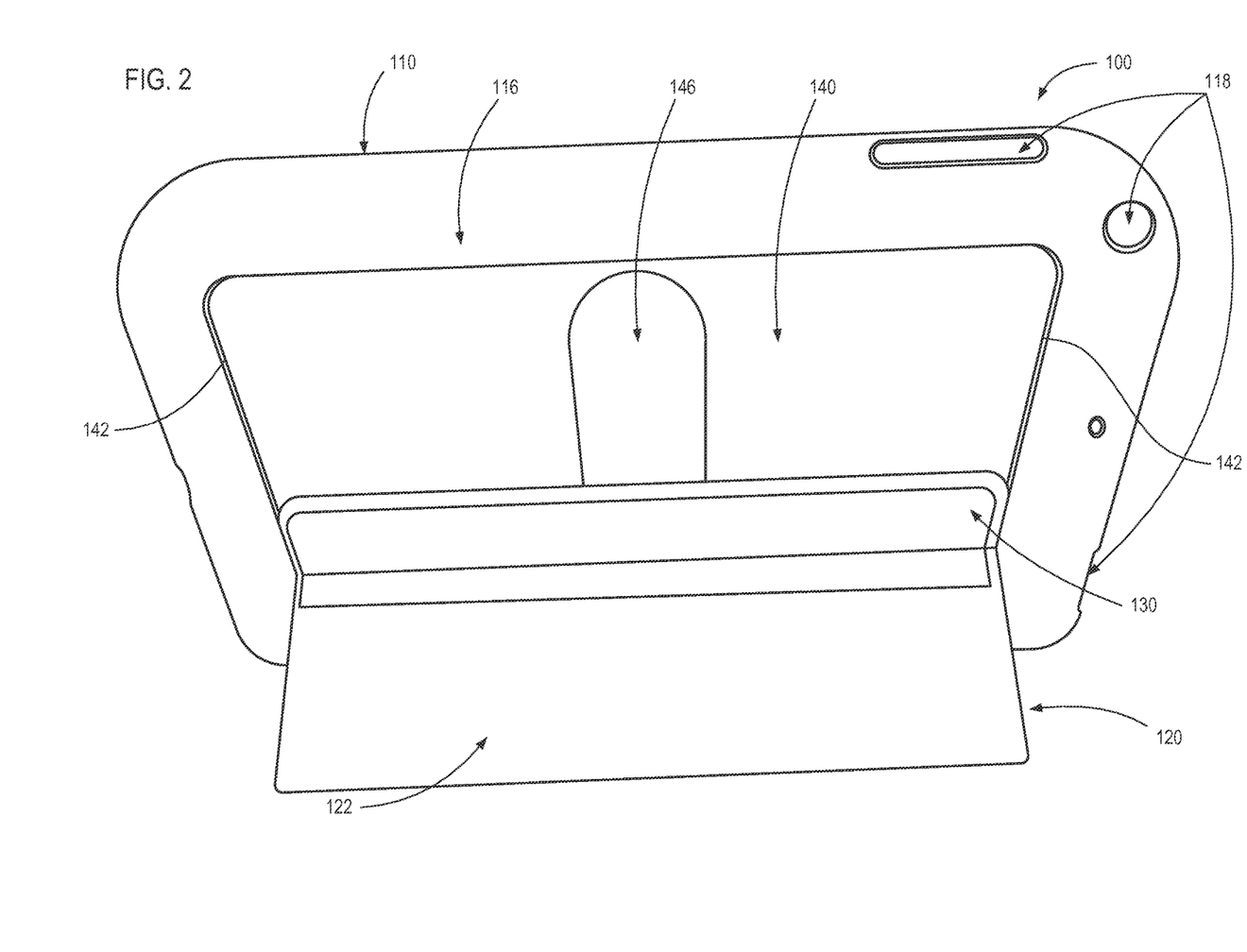
FIG. 2 is a rear view of the case of FIG. 1 with the stand supporting the case in an upright position.
Figure 3:
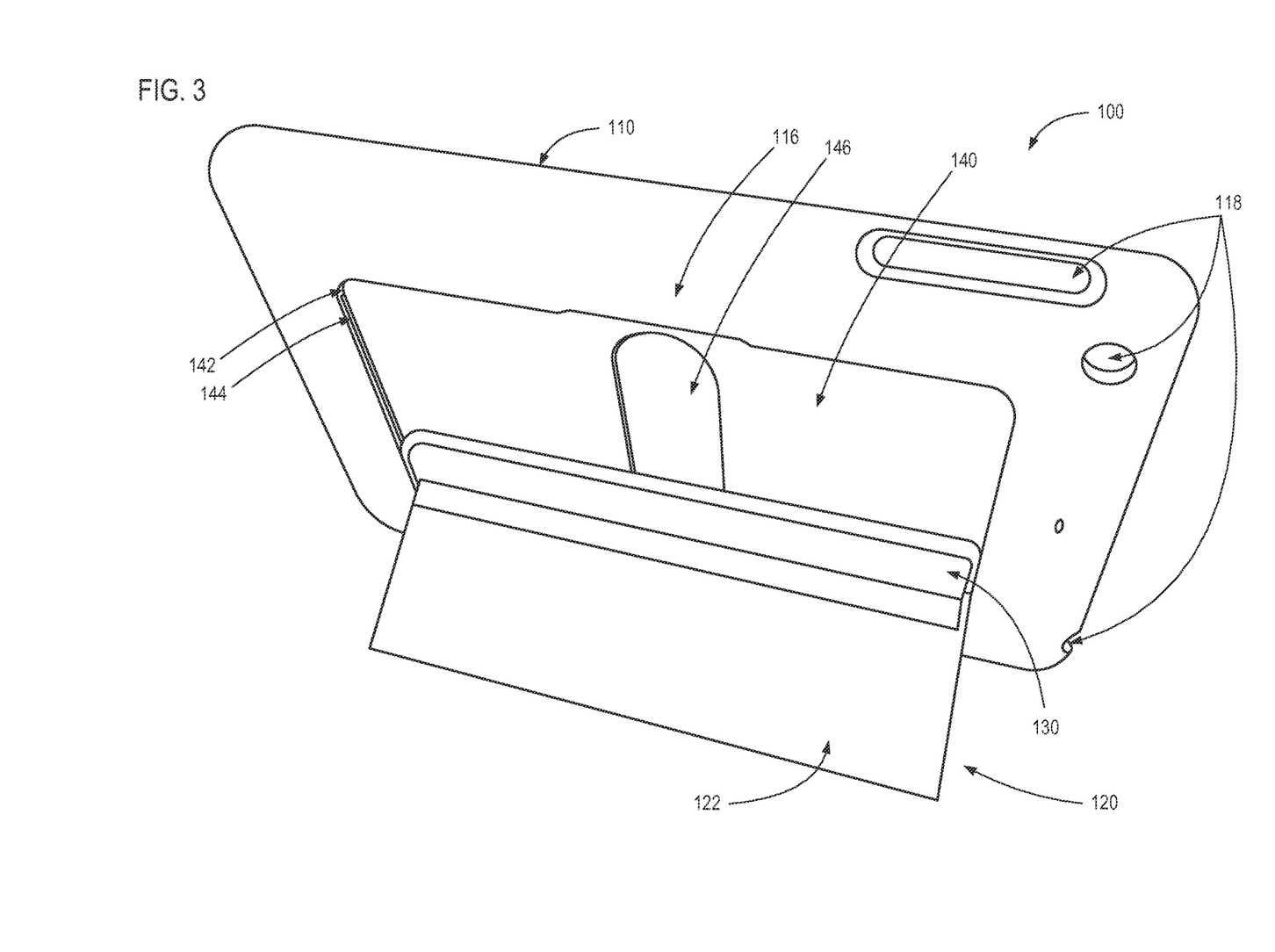
FIG. 3 is a rear perspective view of the case of FIGS. 1-2 with the stand supporting the case in an upright position.

FIGS. 1-3 illustrate various views of a case 100 with a moveable stand 120 supporting the case 100 in an upright position. The case 100 may include a body 110, a stand 120, and a sliding member 130. The body 110 secures and/or protects a PED, while the stand 120 and sliding member 130 may selectively support the case 100 in an upright position. The case's 100 upright position provides the PED user a different viewing angle. Thus, the case 100 may provide protection and support by combining these elements.

Figure 5:
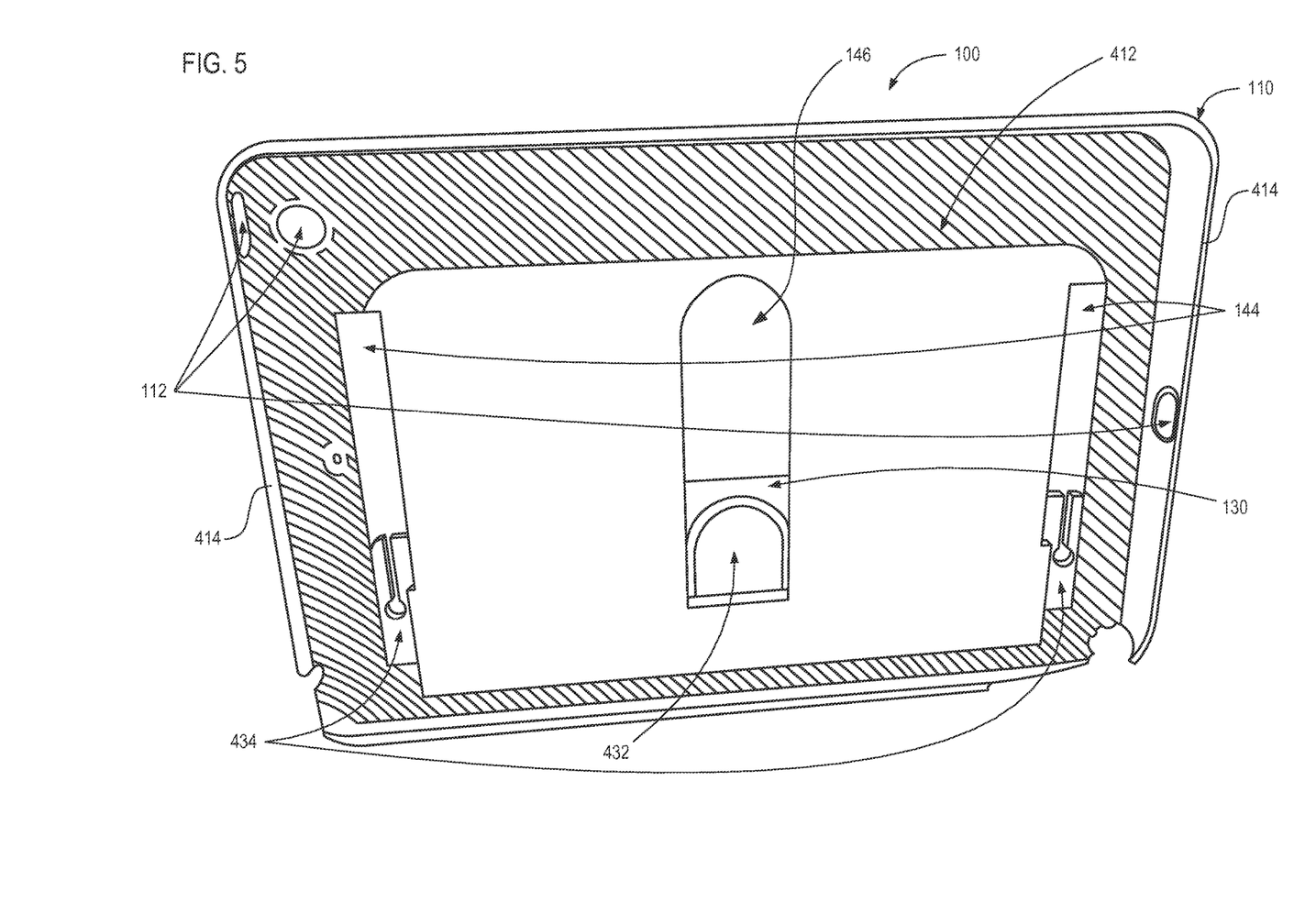
FIG. 5 is a front view of the case without a PED present, and a sliding member in a first position at the bottom of the cavity.
Figure 6:
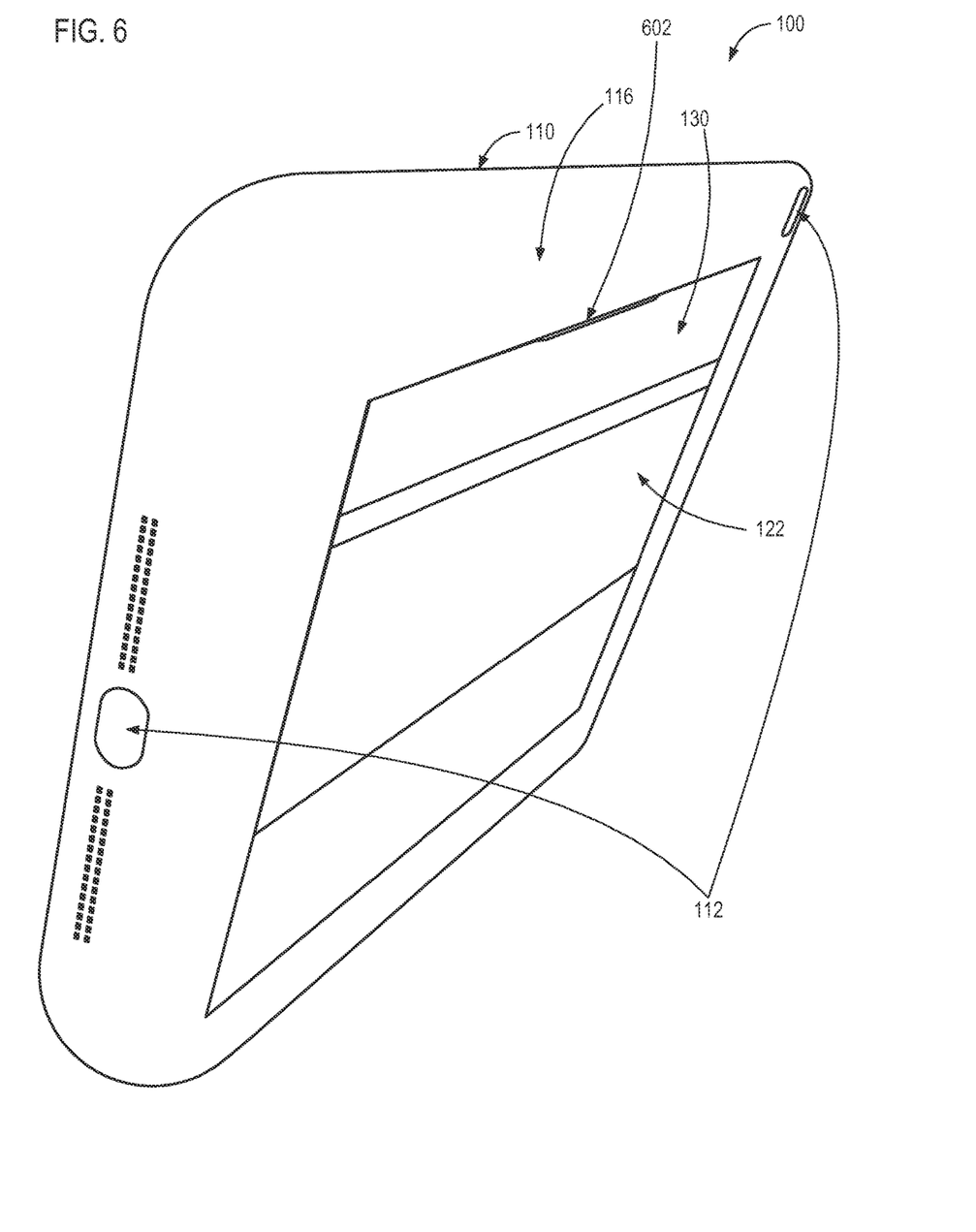
FIG. 6 is a rear perspective view of the case with the sliding member in a second position and the stand in a stored position.

The body 110 may be configured to secure a variety of PEDs. The illustrated embodiment of the body 110 has a shape corresponding to a PED such that it engages the PED around its circumference to retain the PED in the case 100. Front views of the case 100 are shown in FIGS. 5-6, which illustrate how the case 100 receives and secures a PED through frictional engagement. The body 110 may use other mechanisms to secure the PED such as elastics, magnets, adhesives, etc. The body 110 includes a back side 116 to cover and protect a PED back side.

An embodiment of the body 110 may include a plurality of access points 118 for interacting with various elements of a PED. These elements vary by PED and may include, but are not limited to, a camera, USB port, headphone jack, power button, and volume rocker. Further, the body 110 may include a speaker grill 119 to prevent a PED's speaker from being muffled. The speaker grill 119, according to the illustrated embodiment, is composed of a series of holes near the PED's speaker.

The back side 116 forms the majority of the exterior of the case 100. In addition to protection, the back side 116 may include ornamental features, and may not even completely cover the back side of the PED.

The back side 116 may include a cavity or recess 140 that may extend partially through the body 110. The cavity 140 may extend across the majority of the surface area of the back side 116. The cavity 140 may be rectangular and thereby define opposing cavity walls 142. Along the cavity walls 142, grooves 144 may be defined. Further, the cavity's 140 dimensions may be similar to the dimensions of the sliding member 130 and stand 120 when the stand 120 and sliding member 130 are locked into a second or storage position. By having similar dimensions, the sliding member 130 and stand 120 may lie within the cavity 140 and be flush with the back side 116 for compact and easy storage.

The body 110 also may have a center track 146 that guides the sliding member 130 within the cavity 140 and along the back side 116. The sliding member 130 may include a protruding guide (not shown) that is disposed within the center track 146. In the illustrated embodiment, the center track 146 is configured as an oblong slot. Other embodiments may include a track that is not necessarily centered and/or may be composed of railings, cavities, multiple slots, or other similar structures. The center track 146 may be a depression in a back side of the cavity 140 and/or may be a hole that extends entirely through the back side of the cavity 140.

The sliding member 130 may be coupled to the grooves 144 and center track 146 of the body 110. The sliding member 130 may be a panel composed of similar material as the body 110. The panel may be substantially the same width as the cavity 140. The length (i.e., the dimension running parallel to the center track 146) may vary across embodiments depending on, for example, the desired angle of the case 100 when in the upright position. The sliding member 130 and stand's 120 combined length may be less than the cavity's 140 length. This ensures that the stand 120 and sliding member 130 will fit in the cavity 140 when the stand 120 is in a storage position.

The sliding member 130 may slide relative to the body 110 to change the position of the stand 120. The sliding member 130 and the body 110 may be substantially rigid so the force from a user attempting to manipulate the sliding member 130 does not deform the sliding member 130 or body 110 and hinder sliding movement. The coupling of the sliding member 130 to the center track 146 and grooves 144 may limit the sliding member 130 to moving in only one dimension (e.g., the dimension parallel to the length dimension of the center track 146).

In the illustrated embodiment, the stand 120 is pivotally coupled to the sliding member 130. The stand 120 may pivot between a position flush with the rear face and an angle that supports the body 110 in an upright position. Pivotal coupling may be accomplished by a hinge, a flexible section of material, or the like. The sliding member 130 and stand's 120 combined length may be less than the cavity's 140 length. The stand 120 may include one stiff panel or multiple stiff panels 122 pivotally coupled to each other. The overall dimensions of the stand 120 may be substantially similar to or smaller than the cavity 140.

As illustrated, the stand 120 may include two stiff panels 122 coupled by flexible material. One panel 122 may be pivotally coupled to the body 110 proximate to a bottom side 123 of the cavity 140 and the other panel 122 may be pivotally coupled to the sliding member 130. When the sliding member 130 is in a first position adjacent to the bottom of the cavity 140, the panels 122 are forced away from the body 110 into a folded position. The folding point 124, created where the panels 122 are coupled, may rest on a support surface and maintain the body 110 in an upright position when the sliding member 130 is in the first or elevated position. In the first position, the panels 122 extend outward to support the case 100 in an elevated position. The extended panels 122 may also form a grip or handhold for user convenience. In this manner, a user may manipulate the case 100 with a single hand grip of the extended panels 122 in the upright position.

A user may move the sliding member 130 to a second or storage position near the top of the cavity 140. In this position, the stand's 120 coupling to the body 110 and the sliding member 130 cause it to fully extend because the stand's 120 length may be the same as the distance between the first and the second position. This prevents the stand 120 from folding and forces it to remain stored within the cavity 140. The stand 120 may lie flush with the back side 116 as the coupling between the panel 122 and the sliding member 130 is positioned to prevent overlap between the sliding member 130 and the stand 120. The folding point 124 may be located between the coupling of one panel 122 with the body 110 and the coupling of the other panel 122 with the sliding member 130 when the stand 120 is flush in the cavity 140. In the second position, the case 100 is compact for easy storage.

Other embodiments may include more or fewer than two panels 122. For example, the stand 120 in another embodiment may be composed of one stiff panel 122. The stand 120 in this embodiment is pivotally coupled to the sliding member 130 at one end via a hinge, flexible material, or the like. The other end may be free and not attached to the sliding member 130, body 110, or the like. The free end may pivot away from the body 110 to move from the flush position to the elevated or angled position. The coupling between the panel 122 and the sliding member 130 is positioned to prevent overlap between the sliding member 130 and the stand 120. The one panel and the sliding member's 130 combined length may be less than the cavity's 140 length. When the panel 122 pivots away from the body 110, the panel's 122 edge may rest on a support surface and maintain the body 110 in an upright position when the sliding member 130 is in a first position. The stand 120 may also be stored within the cavity 140 when the sliding member 130 is in a second position.

According to various embodiments, the stand 120 can be used to hold the body 110 in a portrait and/or landscape position. The stand 120 may either slide along the shorter dimension or longer dimension of the case 100. A user may selectively place the case 100 in a landscape or portrait position by choosing to rest the stand 120 on a supporting surface at either the stand's 120 folding point/bottom edge 124 or the stand's 120 side.

Figure 4:
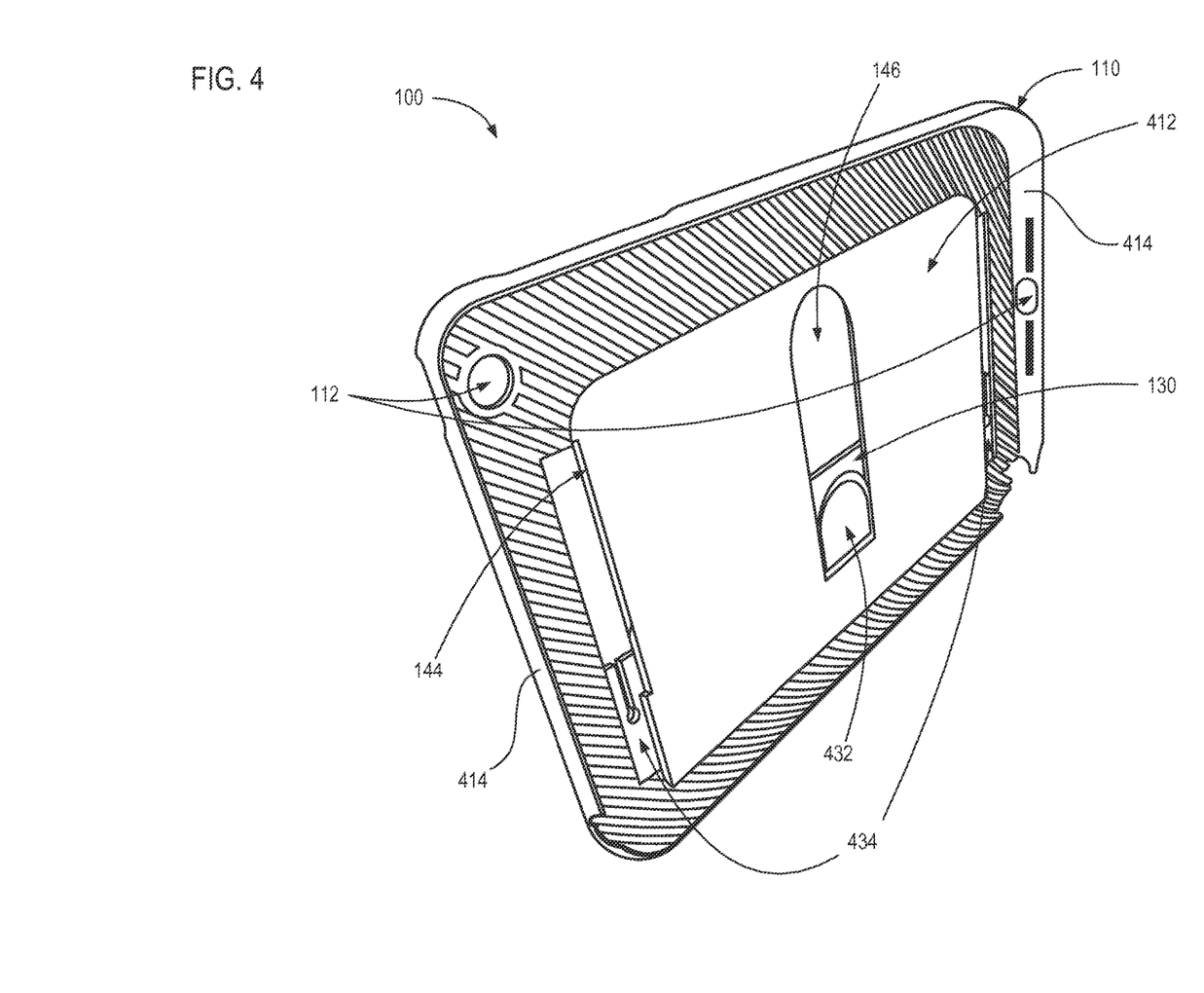
FIG. 4 is a front perspective view of the case without a PED present, and a sliding member in a first position at the bottom of a cavity.

FIGS. 4-5 illustrate various front views of the case 100 without a PED present, and a sliding member 130 in a first or upright position. The body 110 of the case 100 has a front side 412, configured to receive a PED. The body 110 may include sidewalls 414 to secure a PED through frictional engagement or other mechanisms such as elastics, magnets, adhesives, mechanical obstruction, etc. Further, access points 118 may be formed by systematic openings that allow the use of the PED's camera, ports, and/or other elements.

As illustrated, the center track 146 as well as the grooves 144 formed along the cavity walls 142 may remain uncovered along the front side 412. The grooves 144 may open to recessed portions of the front side 412 in order to provide a larger area for the sliding member 130 to engage with the body 110. The recessed portions of the front side 412 prevent a secured PED from rubbing against the sliding member 130 and interfering with its ability to move. The center track 146 and grooves 144 in other embodiments may be covered in order to hide the sliding member and/or further protect a secured PED.

The sliding member 130 may engage with the center track 146. The sliding member may include a guide 432 that may be formed in a variety of shapes and materials. In various embodiments, the guide 432 may be configured as a series of ridges or protrusions. The guide 432 is located proximately in the center of the sliding member 130 and is inserted into the center track 146. The guide 432 is substantially the same width as the center track 146. The similar width ensures that the sliding member 130 is limited to movement along the length of the center track 146.

The sliding member 130 may also engage with the grooves 144 via tabs 434. These tabs 434 are coupled to the sliding member 130 on two sides. The tabs 434 may be substantially rigid so the force from a user attempting to manipulate the sliding member 130 does not deform the tabs 434 and hinder sliding. The tabs 434 are slender enough to be inserted through the grooves 144. When the tabs 434 are inserted through the grooves 144, the tabs 434 interlock with the body 110 to keep the sliding member 130 coupled to the body 110. In the illustrated embodiment, the tabs 434 are inserted through grooves 144 that open to recessed portions of the front face 412, causing the tabs 434 to be in front of the front side 412 while the sliding member 130 remains behind the rear face 116. This ensures the sliding member 130 is limited to one-dimensional movement (e.g., the dimension parallel to the length dimension of the center track).

The tabs 434 may have the ability to lock into a plurality of positions along the grooves 144. Each position would cause the sliding member 130 and stand 120 to hold the body at different viewing angles determined by the angle formed by the stand 120 in that position. The tabs 434 may be able to lock into place via stops (e.g., frictional stops, tab stops, etc.) formed into the grooves 144, the front side 412, and/or the tabs 434.

FIG. 6 is a rear perspective view of the case 100 with the sliding member 130 in a second position and the stand 120 in a stored position. As illustrated, one embodiment may allow the sliding member 130 and stand 120 to move between a first position in which the stand 120 supports the device in an upright position, and a second position in which the stand 120 lies flush with the body 110 in the cavity 140.

The second position allows for easy compact storage. In the illustrated embodiment, the stand 120 is smaller than the cavity 140. As a user moves the sliding member 130 away from the first position, the stand 120 unfolds and eventually reaches a point at which it is fully extended, causing it to be completely flat. At this point the sliding member 130 has reached the second position and is locked into place at the top of the cavity 140. The sliding member 130 may frictionally engage with the body 110 to lock into place. The sliding member 130 may have a finger hold 602 for user convenience when returning the sliding member 130 to the first position. The finger hold 602 may be a notch, a textured grip, a pull tab, etc. In the second position the stand 120 may lie within the larger cavity 140, covering the center track 146 and resting flush with the rear face 116.

Figure 7:
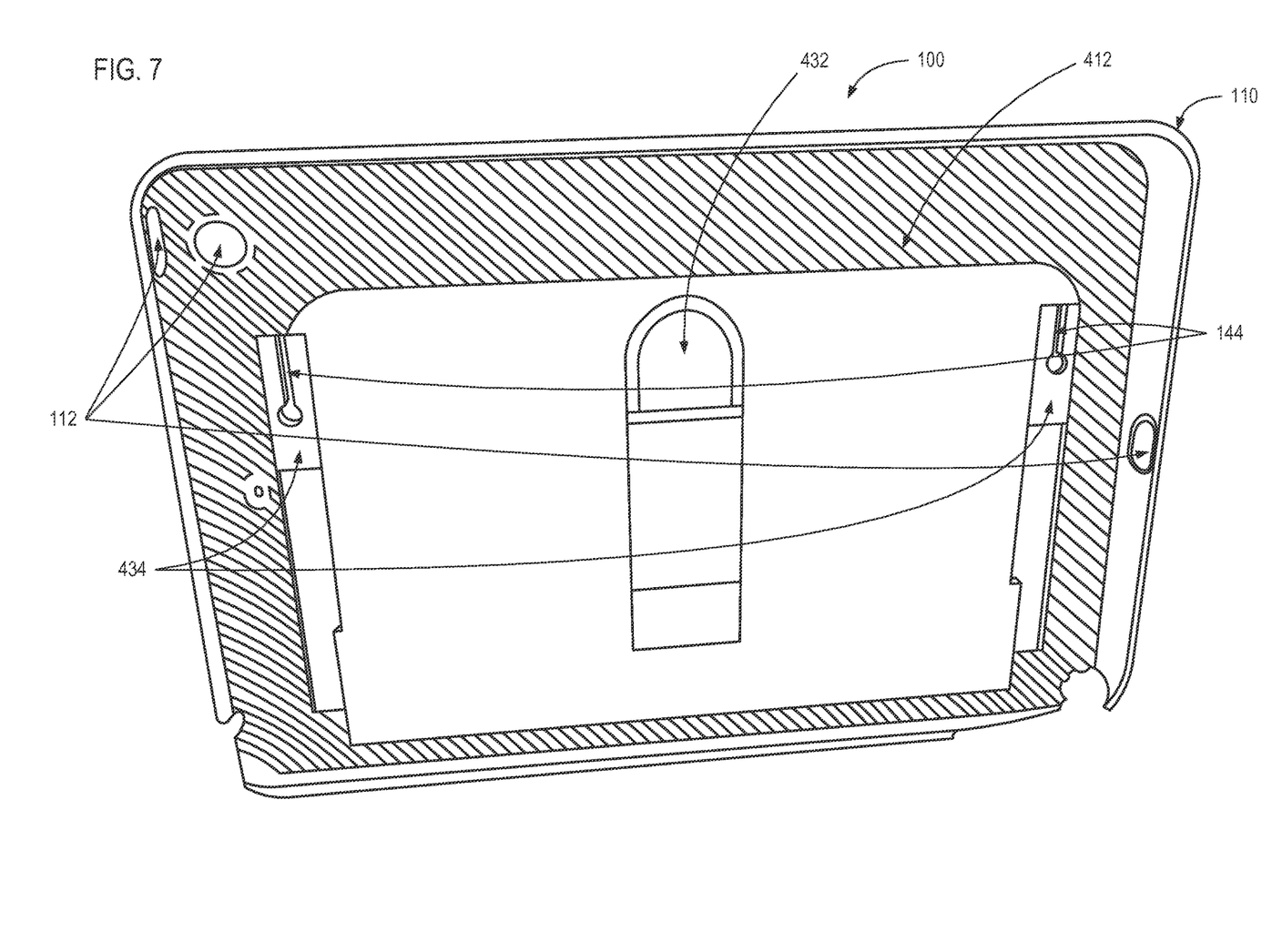
FIG. 7 is a front perspective view of the case with the sliding member in a second position at the top of the cavity.

FIG. 7 is a front perspective view of the case 100 with the sliding member 130 in a second or flush position at the top of the cavity 140. The guide 432 and tabs 434 in this position may be located at the top of the center track 146 and grooves 144. The top portion of the center track 146 and/or grooves 144 may prevent the user from sliding the sliding member 130 any further. Additionally, the tabs 434 and/or center track may be able to lock into this position via stops (e.g., frictional stops, tab stops, etc.) formed into the grooves 144, the front side 412, and/or the tabs 434. Such stops prevent the sliding member 130 from returning to a first position without a user applying force.

The above description provides numerous specific details for a thorough understanding of the embodiments described herein. However, those of skill in the art will recognize that one or more of the specific details may be omitted, or other methods, components, or materials may be used. In some cases, operations are not shown or described in detail. Additionally, features or elements described in conjunction with any one embodiment may be adapted for use with and/or combined with the features of any other embodiment.

What is claimed:

1. A case for a portable electronic device, the case comprising:
    a body including,
        a front side to receive the portable electronic device,
        a back side including a cavity having a width, and
        first and second opposing cavity walls;
    a sliding member comprising a panel slidably engaged with the cavity walls, the panel extending along substantially the entire cavity width, to allow the sliding member to move within the cavity; and
    a stand pivotally coupled to the sliding member, the stand comprising,
        a first panel pivotally coupled to the sliding member, and
        a second panel pivotally coupled to the first panel and pivotally coupled to the body,
    wherein the sliding member and stand move between an elevated position in which the stand supports the case at an angle and a storage position in which the stand is substantially flush within the cavity.

2. The case of claim 1, wherein the opposing cavity walls include grooves to engage the sliding member.

3. The case of claim 2, wherein the sliding member and the grooves are configured to lock the sliding member into a plurality of positions to vary the angle.

4. The case of claim 2, wherein the sliding member includes first and second tabs to engage the corresponding grooves.

5. The case of claim 1, wherein the body includes a center track disposed in the cavity and configured to receive a portion of the sliding member.

6. The case of claim 5, wherein the sliding member includes a guide to engage the center track.

7. The case of claim 5, wherein the center track extends from the back side to the front side of the body.

8. The case of claim 1, wherein the sliding member includes a finger groove.

9. A case for a portable electronic device, the case comprising:
    a body including,
        a front side to receive the portable electronic device, and
        a back side including a rectangular cavity having a width defining first and second opposing cavity walls;
    a sliding member comprising a panel disposed within the cavity and slidably engaged with the cavity walls, the panel extending along substantially the entire cavity width, to allow the sliding member to move within the cavity; and
    a stand including,
        a first panel pivotally coupled to the body, and
        a second panel pivotally coupled to the first panel and pivotally coupled to the sliding member,
    wherein the sliding member and stand move between an elevated position in which the first panel rests on a surface and the second panel extends at an angle from the surface to support the case and a storage position in which the stand is substantially flush within the cavity.

10. The case of claim 9, wherein the opposing cavity walls include grooves to engage the sliding member.

11. The case of claim 10, wherein the sliding member and the grooves are configured to lock the sliding member into a plurality of positions.

12. The case of claim 10, wherein the sliding member includes first and second tabs to engage the corresponding grooves.

13. The case of claim 9, wherein the body includes a center track disposed in the cavity and configured to receive a portion of the sliding member.

14. The case of claim 13, wherein the sliding member includes a guide to engage the center track.

15. The case of claim 13, wherein the center track extends from the back side to the front side of the body.

16. The case of claim 9, wherein the combined length of the stand and the sliding member is substantially the same as the length of the cavity.

17. The case of claim 9, wherein the cavity extends across the majority of the back side of the case.

18. The case of claim 9, wherein the sliding member includes a finger groove.

19. A case for a portable electronic device, the case comprising:
- a body including,
  - a front side to receive the portable electronic device, and
  - a back side,
  - wherein the body includes a length and a width to allow support of a portable electronic device in portrait and landscape configurations;
- a sliding member comprising a panel;
- a track extending along the body length and disposed on the back side and configured to receive a portion of the sliding member;
- a stand including,
  - a first panel pivotally coupled to the sliding member, and
  - a second panel pivotally coupled to the first panel and pivotally coupled to the back side,
- wherein the sliding member and stand move to an elevated position in which the stand supports the case in either a portrait or a landscape configuration, and
- wherein the sliding member and stand move to a storage position wherein the sliding panel and stand, including the first and second panels, extend along the same plane.

* * * * *